Patented Aug. 31, 1954

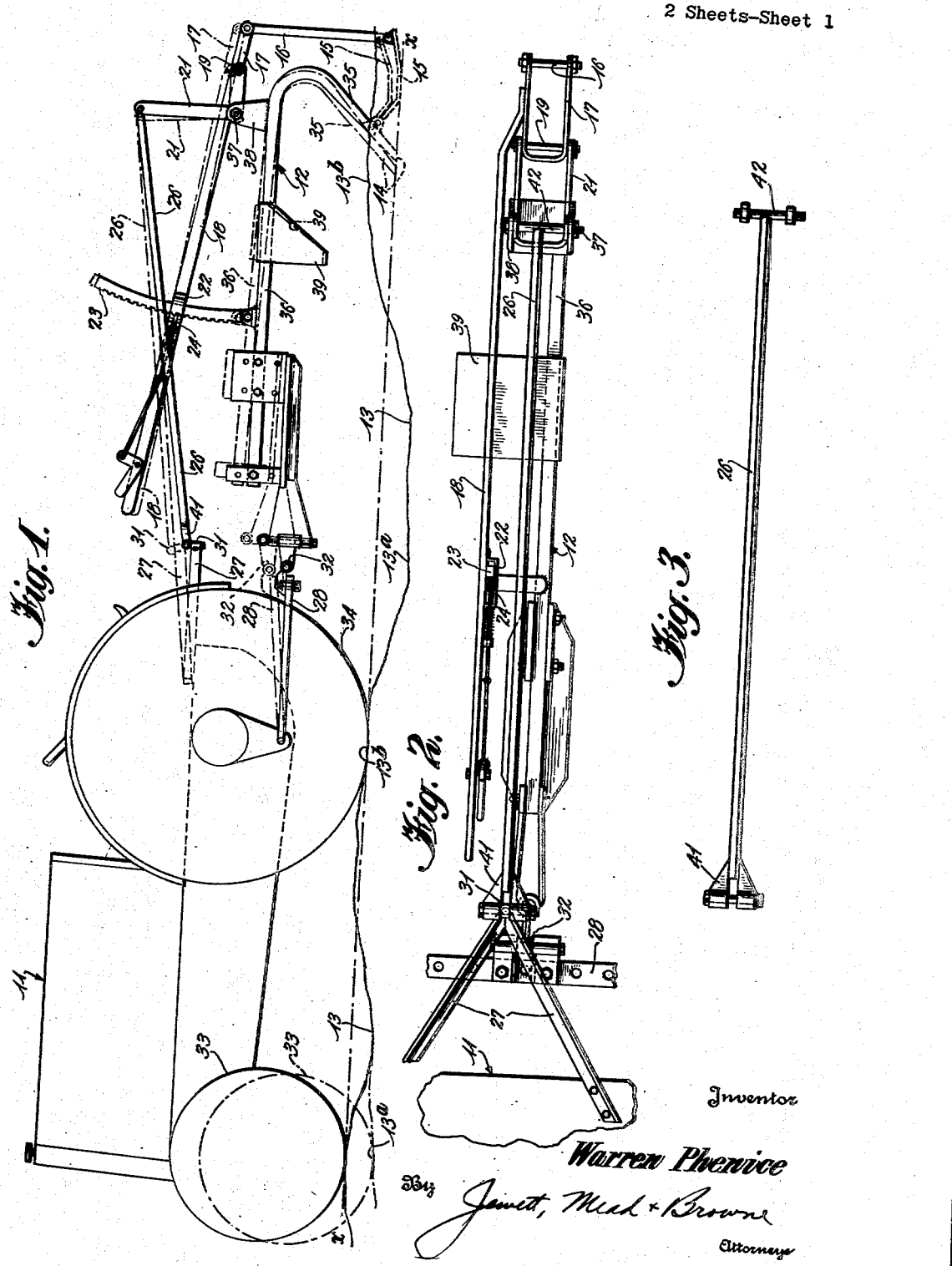

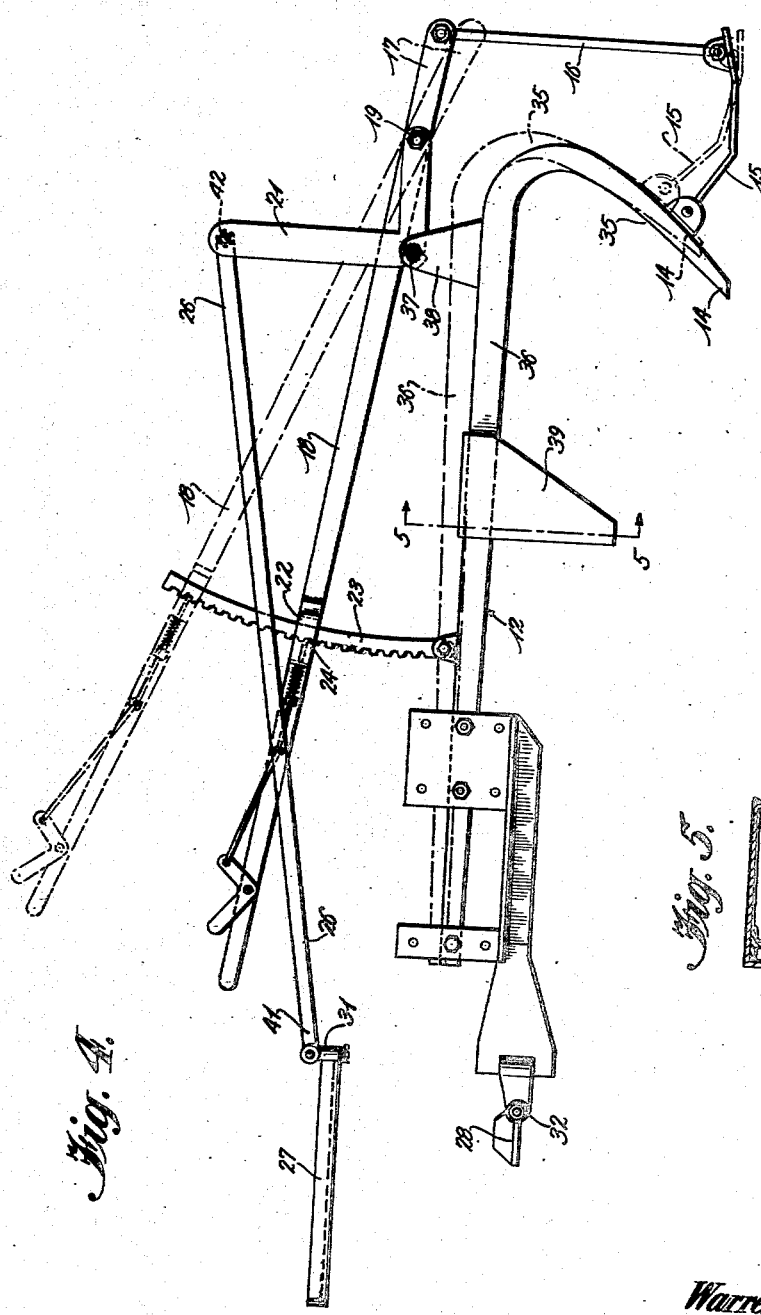

2,687,681

UNITED STATES PATENT OFFICE 2,687,681

AGRICULTURAL IMPLEMENT

Warren Phenice, Elton, La.

Application March 9, 1948, Serial No. 13,897

2 Claims. (Cl. 97—46.95)

This invention relates to agricultural implements for plowing or cultivating the soil. More particularly, the invention pertains to implements for plowing or cultivating rough, uneven terrain. The invention, in some of its more specific aspects, relates to apparatus which is automatically adjustable to compensate for irregularities in the terrain over which it is operated and which regulates the depth of cut made by that part of the plowing or cultivating implement which penetrates the soil.

It has been a problem in plowing ground of uneven topography to maintain constant the depth of penetration of the plowing implement inasmuch as the point of the implement otherwise may penetrate the soil too deeply or not deeply enough, depending upon irregularities of the terrain and the relative levels of the implement and the means employed to draw the implement over the ground.

Many efforts have been made to overcome the problem but none of the devices known hitherto has provided the advantages of the apparatus of the present invention, nor have any of the prior devices employed the new and novel arrangement of elements contemplated herein.

In plowing or cultivating the soil in modern farming practice, a tractor or other prime mover having a semi-rigid coupling means ordinarily has attached thereto the beam of a plow to draw it over the surface of the ground to be cultivated. As the tractor moves over level ground it normally moves along a substantially horizontal axis but in passing over ground of irregular contour, the horizontal axis of movement of the tractor changes in a substantially vertical plane as the front wheels of the tractor come to a low spot in the terrain and the rear wheels ride on higher ground. The horizontal axis of movement of the tractor changes in the opposite direction as the front wheels come to higher spots on the terrain and the rear wheels ride on lower ground. The change in the horizontal axis of movement of the tractor in either direction is transmitted through the aforementioned semi-rigid coupling means to the beam of the plow and thus causes the point of the implement to penetrate too deeply at times and clear the ground completely at other times.

The apparatus of the present invention overcomes these objectionable features by providing a compensating lever assembly connecting the tractor and the implement to automatically adjust the penetration of the point of the implement to a uniform depth, regardless of the deviation of the tractor from the normal horizontal axis of movement. Thus, where there is a tendency for the point to penetrate the ground too deeply, the compensating lever assembly automatically responds to the change in the horizontal axis of movement of the tractor to adjust the position of the point with respect to the ground level and maintain a uniform depth of penetration. If there is a tendency of the point to come out of the ground, the compensating lever automatically responds to the change in the horizontal axis of movement of the tractor to adjust the position of the point with respect to the rest of the implement and maintain a uniform depth of penetration below the ground level.

It is, therefore, an object of the present invention to provide an agricultural implement which is suitable for use in plowing or cultivating rough, uneven terrain.

It is a further object of the invention to provide an implement which penetrates the ground to a substantially constant depth regardless of the roughness or unevenness of the terrain over which it is drawn.

It is a further object to provide means for adjusting to a predetermined magnitude the depth to which the implement is to penetrate the soil and which deph will remain substantially constant regardless of the roughness or unevenness of the terrain over which it is drawn.

It is another object of the present invention to provide means which will automatically compensate for roughness or unevenness of the terrain over which the implement is drawn whereby the depth of penetration of the implement into the ground is maintained at a substantially constant predetermined magnitude.

The inventive concept is capable of employment in a number of different types of apparatus but, for purpose of illustration, but without any intention to limit the scope thereto, the invention will be described hereinafter as it is employed to advantage in a plow of the type shown in the accompanying drawings, wherein:

Figure 1 is a side elevation of a tractor and plow of the present invention coupled in position for use. The solid lines show the position of the tractor and the plow of the present invention on level ground. The dotted lines indicate the relative position of the invention when the front wheels of the tractor are in a depression in the terrain.

Figure 2 is a plan view of the plow of the present invention and a fragment of the tractor to which it is coupled.

Figure 3 is a plan view of one of the elements of the compensating lever assembly of the plow shown in Figure 2.

Figure 4 is a side elevation of the plow of the present invention, on an enlarged scale, showing in solid and dotted lines the alternative positions of the elements of the plow under different conditions of operation.

Figure 5 is a cross section of the levee cutter shown in Figure 4, through line 5—5 thereof.

Throughout the specifications and drawings, like reference characters refer to like parts.

The drawings show one embodiment of the present invention as it is employed in a plow which is drawn by a tractor having suitable coupling means for attaching the plow thereto. The invention and the mode of operation of the illustrated embodiment is explained in detail hereinafter.

As tractor 11 draws plow 12 over terrain 13 along horizontal axis x—x during normal plowing operations, the plow point 14 penetrates the soil to a predetermined depth which is regulated principally by shoe 15 in the manner described in greater detail hereinafter. As long as the tractor and plow move over level terrain, the only adjustment that is effected in operation of the implement is through link 16 carried within yoke 17 of adjustment lever 18.

Lever 18 is pivotally supported intermediate the ends thereof by pin 19 at one end of bell crank lever 21 being rigidly connected, as by welding to an arm of yoke 17. Between the pivot of lever 18 and the handle portion thereof, a collar 22 surrounds a pivotally mounted guide bar 23 which is held in a pre-selected position by a latch and detent means 24 associated with the handle portion of lever 18.

As long as tractor 11 and plow 12 move over even terrain, the aforementioned elements and tie rod 26 remain in relatively fixed relation to each other. This relationship is maintained as long as upper fixed drawbar 27 and lower fixed drawbar 28 lie in a substantially horizontal position. Through coupling pintle 31 and four-way hitch 32 the plow may be drawn steadily even as tractor 11 changes its direction of movement to right or left, without affecting the depth of penetration of the plow point into the soil.

When tractor 11 draws plow 12 over rough terrain, however, there is a tendency for the change in relative positions of the tractor and plow to cause the plow points to vary in its depth of penetration into the soil. It is to overcome this difficulty that the apparatus of the present invention is provided. By way of example, if the front wheels 33 of the tractor drop into depression 13a, shown in dotted lines in Fig. 1, to a level lower than that of the rear wheels 34 on higher ground 13b the elevation of upper and lower drawbars 27 and 28 results in a tension on movable drawbar 26, which, in turn, is transmitted through bell crank lever 21 and link 16 to lift the rear end of shoe 15 about the point at which it is pivotally mounted on plowshare 35. At the same time, upward movement of lower drawbar 28 causes plow beam 36 and plowshare 35 to rotate slightly about the fulcrum 37 of bell crank lever 21 supported by bracket 38 and thereby change the parallelism between tie rod 26 the beam 36. This action permits the plow point to maintain constant its depth of penetration when otherwise the point might be raised clear out of the ground as the front wheels of the tractor come to a depression in the terrain. Conversely, otherwise, the point would have a tendency to dig too deeply into the ground when the front wheels pass over ground at a level higher than that over which the rear wheels are passing.

In some circumstances the surface of the terrain is such that it is difficult for the plowshare and blade to cut through a high spot in the soil. To facilitate movement of the plow through such soil, the beam carries a levee cutting blade 39 which cuts a path for the plowshare and blade which follow.

From the foregoing it will be seen that at least three adjustments may be effected in the relationship of the respective elements of the plow. First, a manual adjustment of lever 18 may be effected, as shown in Figure 4, whereby the predetermined depth of penetration of the plow point 14 may be set. Second, if the front wheels 33 of the tractor pass to a point lower than the rear wheels 34 the linkage assembly causes compensatory adjustment of the shoe 15 and plow point 14 to prevent the point from clearing the terrain completely. Third, if the front wheels 33 pass to a point higher than the rear wheels 34 of the tractor, the linkage assembly causes adjustment of the shoe 15 to prevent the point 14 from penetrating the soil too deeply.

Some of the individual elements of the apparatus of the present invention possess considerable novelty and contribute to the proper functioning of the apparatus as a whole. The tie rod 26 shown in Figure 3, for example, provides a simple, convenient linkage between the tractor and the plow. The rod includes a yoke portion 41 in which a pintle is engaged and through which the plow is coupled to the upper drawbar 27 of the tractor. At the opposite end of the rod 26 is a T-head 42 which serves as a connecting element for attaching the tie rod to bell crank lever 21, as shown in Figures 2 and 4.

The construction of bell crank lever 21 is such that the load transmitted therethrough is distributed through the bilateral arms thereof and thus provides an easier, smoother working linkage between tie rod 26 and adjustment lever 18. It will be seen that the U-shaped support 38 for the bell crank lever 21 is arranged with its upstanding arms in supporting engagement with the bilateral arms of bell crank lever 21.

The aforementioned bilateral construction is also embodied in the yoke 17 at the end of adjustment lever 18 and thus provides a strong, easily operated means for transmitting the movement from the bell crank lever 21 to the shoe 15 through link 16. For the purpose of simplifying the construction of the adjustment lever, the bilateral construction is limited to the yoke portion and the single metal piece which serves as an operating lever is welded or otherwise fixed to one side of the yoke 17.

It will be understood from the foregoing that many different kinds of coupling elements may be substituted for those used in the present apparatus without departing from the spirit of the invention. The pintle and four-way hitch illustrated herein may be replaced by suitable universal couplings, if desired. The plow beam and, indeed, many of the other elements of the implement may be replaced by other elements under certain conditions. The scope of the present invention, therefore, is not limited to the illustrated embodiment, but rather is intended to cover, by suitable expression in the appended claims whatever features of patentable novelty reside in the invention.

I claim:

1. In combination with a tractor, an agricultural implement for plowing comprising a pair of horizontally extending, vertically spaced drawbars; a pair of couplings corresponding to said drawbars and adapted to connect the implement to said tractor; a beam attached at one end to the lowermost of said pair of drawbars; a ground-penetrating point at the opposite end of said beam; a tie rod attached at its forward end to the uppermost of said pair of drawbars; a bell crank lever having one end thereof attached to the rear end of said tie rod and having its fulcrum adjacent said beam; a point-adjusting lever having a handle portion at one end, a yoke portion at the other end, and a pivot therefor carried by the opposite end of said bell crank lever; a bracket on said beam for pivotally supporting said bell crank lever at its fulcrum; and a control linkage providing a connection between the free end of said point adjusting lever and said point, including a shoe pivotally carried by said point and said control linkage.

2. Apparatus of the character described in claim 1 wherein a levee cutting blade is mounted on said beam between said point and the coupling of said lowermost drawbar.

References Cited in the file of this patent

UNITED STATES PATENTS

| Number | Name | Date |
| --- | --- | --- |
| 1,030,282 | Clancy | June 25, 1912 |
| 1,175,507 | Brudz | Mar. 14, 1916 |
| 1,279,792 | Ulevog | Sept. 24, 1918 |
| 1,637,811 | Ferguson | Aug. 2, 1927 |
| 1,979,750 | Larsen | Nov. 6, 1934 |
| 2,271,533 | Altgelt | Feb. 3, 1942 |
| 2,386,378 | Wippel | Oct. 9, 1945 |
| 2,462,641 | Hyland et al. | Feb. 22, 1949 |

FOREIGN PATENTS

| Number | Country | Date |
| --- | --- | --- |
| 4,632 of 1926 | Australia | Nov. 10, 1927 |
| 320,070 | Germany | Apr. 9, 1920 |
| 139,813 | Great Britain | Mar. 5, 1920 |